(No Model.) 2 Sheets—Sheet 2.
C. O. TINKER.
ROLLER DIE FOR MAKING AUGER AND BIT BLANKS.
No. 286,972. Patented Oct. 16, 1883.
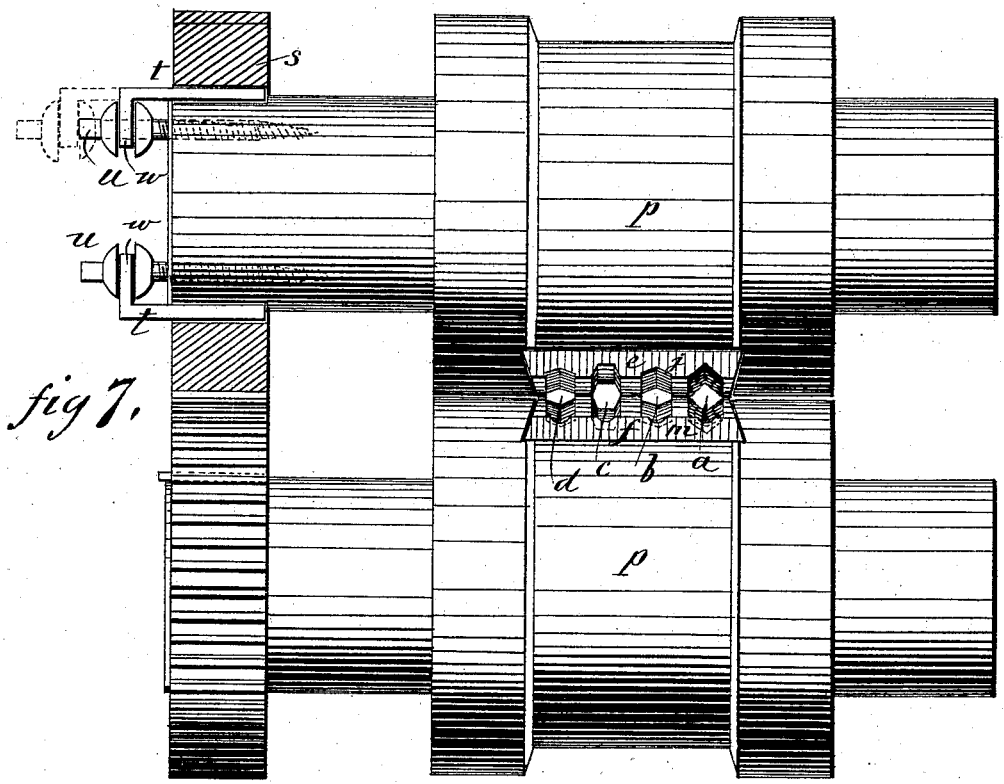
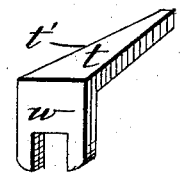
WITNESSES:
Chas. T. Howell.
C. Sedgwick
INVENTOR:
C. O. Tinker
BY Munn & Co.
ATTORNEYS.

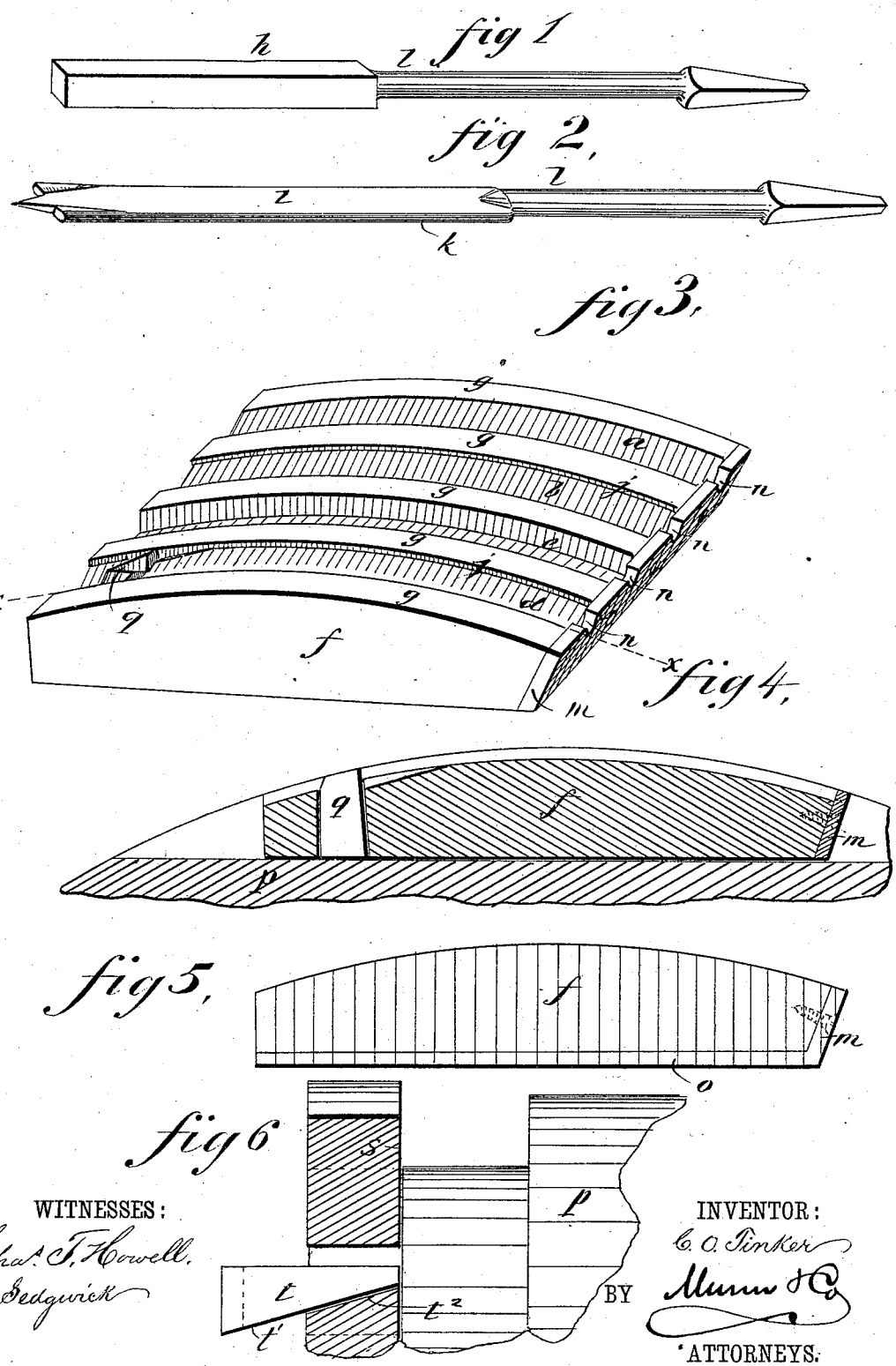

UNITED STATES PATENT OFFICE.

CHARLES O. TINKER, OF ASHTABULA, OHIO.

ROLLER-DIE FOR MAKING AUGER AND BIT BLANKS.

SPECIFICATION forming part of Letters Patent No. 286,972, dated October 16, 1883.

Application filed March 15, 1883. (No model.)

*To all whom it may concern:*

Be it known that I, CHARLES O. TINKER, of Ashtabula, in the county of Ashtabula and State of Ohio, have invented new and useful Improvements in Roller-Dies for Making Auger and Bit Blanks, of which the following is a full, clear, and exact description.

The object of the invention is to improve and cheapen the manufacture of auger and bit blanks by the improvements hereinafter described, and pointed out in the claims.

Reference is to be had to the accompanying drawings, forming part of this specification, in which similar letters of reference indicate corresponding parts in all the figures.

Figure 1 is a perspective view of the bar of steel from which the blank is to be formed. Fig. 2 is a perspective view of the blank as made from the bar of Fig. 1. Fig. 3 is a perspective view of one of the die-blocks of my invention. Fig. 4 is a longitudinal section of Fig. 3 on line $x\ x$. Fig. 5 is a side elevation of a die-block with a modified arrangement of the guide attachment. Fig. 6 is a section of one of the driving-pinions on line $y\ y$ of Fig. 8, showing the adjusting contrivance for setting the dies. Fig. 7 is a side elevation of the die-rolls and section of one of the pinions, also showing the adjusting device. Fig. 8 is a transverse section of the driving-pinions and die-rolls, and Fig. 9 is a perspective view of one of the adjusting-keys used for setting the dies.

Instead of making the tongue-and-groove dies of common arrangement, I propose to make my die-grooves of uniform shape and dimensions in each of the die-blocks $e$ and $f$— that is to say, the grooves are formed half in each block, the grooves of each block being made the same depth below the surface $g$, and also the same dimensions and shape, so that the blank, which is of like form on each side, is formed alike in each, which I find in practice to be equally as effective in shaping the blanks as the tongue-and-groove form, and it enables the dies to be made much cheaper by enabling both blocks to be turned up at the same time.

For a set of die-grooves to produce blanks $i$ from square or flat bars $h$, I propose to make the pair $a$, for the first pass, of the simple angular crease, of uniform shape from bottom to the surface of the rolls, but deeper than the next succeeding grooves, $b$, which I make shallower and flatter, with edges $j$ square to the surfaces of the rolls in which the blank is to be reduced to its desired form, with edges $k$ of the proper thickness; but for perfecting the form I propose to have another pair of grooves, $c$, rolling the blank edgewise, and then another pair, $d$, substantially like $b$, but slightly smaller, for finishing the blank.

For centering the bars $h$ and the partly-formed blanks and properly holding them in the die-groove by the shanks $l$, I propose to attach a plate, $m$, to the front end of the lower die-block, having a notch, $n$, of suitable form and size coincident with each groove, in which the shank will be suitably confined to properly center the blank when the rolls begin to act on it. This plate may be screwed directly on the end of the die-block, or it may be turned up from a plate, $o$, secured to the die-roll $p$ under the die-block. This plate is designed to take the place of the grooves commonly made in the rolls for the shanks, making a substitute that is equally as efficient and is less expensive, because it avoids turning the shank-grooves in the dies. The cut-off dies $q$ may be attached as in other dies.

For setting the rolls $p$ circumferentially, so that the dies will match each other properly lengthwise or endwise, I propose to have one of the driving-pinions $s$ loose on its roll $p$, and attach it to the roll by taper keys $t$ with screws $u$ or other equivalent devices for adjusting the rolls, the keys being so fitted that the pinion $s$ will be shifted one way or the other, according as the keys are alternately shifted in and out, the opposite keys, $t$, having reversely-arranged inclined side edges, $t'$, fitting against correspondingly-inclined seats $t^2$ of the loose pinion $s$, which latter, by being moved on its roll $p$ while meshing with the fixed pinion of the opposite roll, will shift the rolls circumferentially in relation to each other as required. The screws connect with the notched heads $w$ of the keys $t$, and screw into the end of the roll; but I do not limit myself to any particular arrangement of adjusting devices.

Having thus described my invention, I claim as new and desire to secure by Letters Patent—

1. The combination, with the die-block $f$, of the plate $o$, carrying the guide-plate $m$ and secured under the block to the die-roll, as described.

2. The roller-dies having the pair of die-grooves $a$ made angular from the bottom to the roller-surface, the pair of succeeding grooves $b$ made flatter and shallower, with edges $j$ squared to the roller-surface, the pair of edge-rolling grooves $c$, and the pair of shaping and finishing grooves $d$, whereby the bar $h$ may be first formed into blanks $i$, then reduced, then made with edges $k$, and finally finished in shape, as described.

3. The combination, with the rolls $p$, of the loose pinion $s$, having inclined seats $t^2$, the taper keys $t$, having reversely-inclined side edges, $t'$, and notched heads $w$, and the screws connecting with said notched heads, as and for the purpose specified.

CHARLES O. TINKER.

Witnesses:
THADDEUS E. HOYT,
JUSTUS F. MUNSELL.